United States Patent

Kawasaki

Patent Number: 5,928,366
Date of Patent: Jul. 27, 1999

[54] MICROCOMPUTER BASED SYSTEM FOR THE FAIL-SAFE CONTROL OF AN ELECTRIC MOTOR OR THE LIKE

[75] Inventor: Tetsuya Kawasaki, Tokyo, Japan

[73] Assignee: NEC Corporation, Tokyo, Japan

[21] Appl. No.: 08/936,809

[22] Filed: Sep. 24, 1997

[30] Foreign Application Priority Data

Sep. 25, 1996 [JP] Japan ................................. 8-253135

[51] Int. Cl.⁶ ............................................. G06F 1/04
[52] U.S. Cl. ......................................................... 713/601
[58] Field of Search ................................. 395/557, 560; 713/502, 601

[56] References Cited

FOREIGN PATENT DOCUMENTS

| | | |
|---|---|---|
| 62-3371 | 1/1987 | Japan . |
| 62-244288 | 10/1987 | Japan . |
| 63-29872 | 2/1988 | Japan . |
| 63-271601 | 11/1988 | Japan . |
| 2-21302 | 1/1990 | Japan . |
| 2-199503 | 8/1990 | Japan . |
| 4-255173 | 9/1992 | Japan . |
| 4-260915 | 9/1992 | Japan . |
| 6-83985 | 3/1994 | Japan . |
| 6-149627 | 5/1994 | Japan . |
| 7-15996 | 1/1995 | Japan . |

OTHER PUBLICATIONS

Ein universeller digitaler Regler mit Mikrorechner; Regelungstechnische Praxis 10 1978); pp. 289–294.

Primary Examiner—Thomas M. Heckler
Attorney, Agent, or Firm—Foley & Lardner

[57] ABSTRACT

A microcomputer is capable of detecting an output failure by itself and stopping rotation of an electric motor that is controlled by the microcomputer when the rotational speed of the electric motor falls outside of a predetermined allowable range. A boundary value is established which represents an allowable minimum value for the rotational speed of an electric motor controlled according to an active duration of control pulses. A boundary value register compares a setting for the active duration, which is held in a comparison register, with a boundary value, and if a predetermined condition is satisfied, determines a failure and outputs a signal indicative of the failure. The outputting of control pulses to an electric motor is inhibited if the setting for the active duration, held in the comparison register, is of a value that would cause a failure.

24 Claims, 3 Drawing Sheets

[Fig.1] (Prior Art)
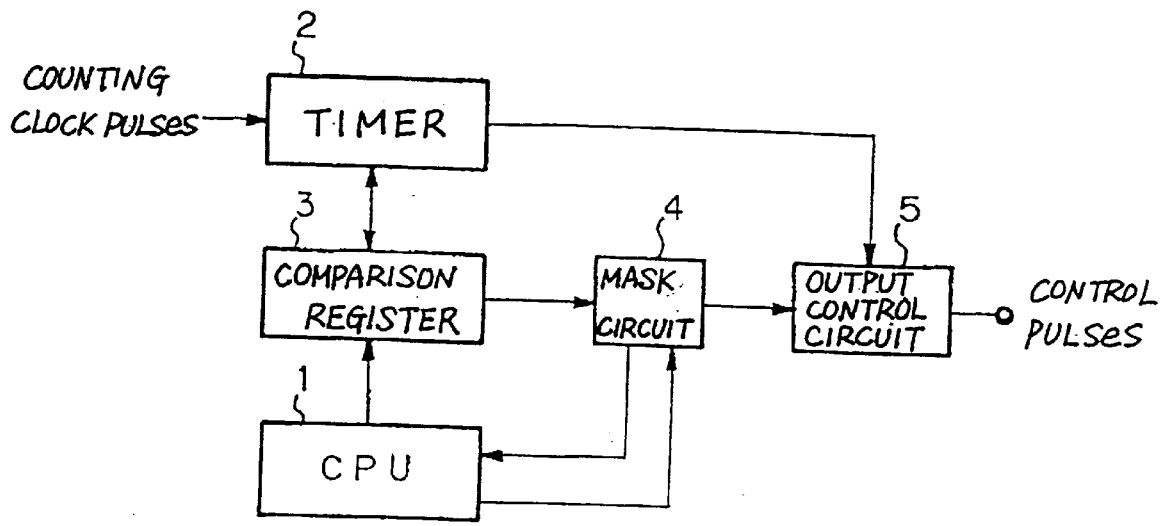
[Fig.2] (Prior Art)
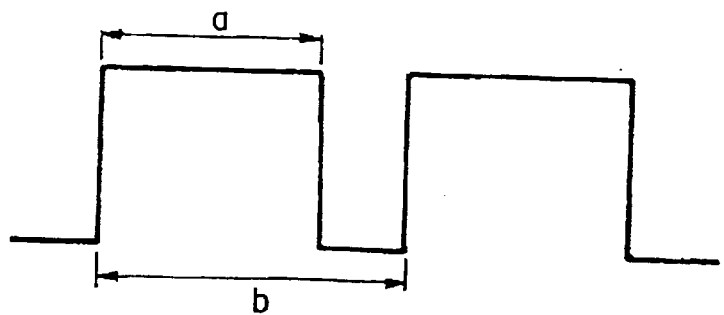

[Fig.3]
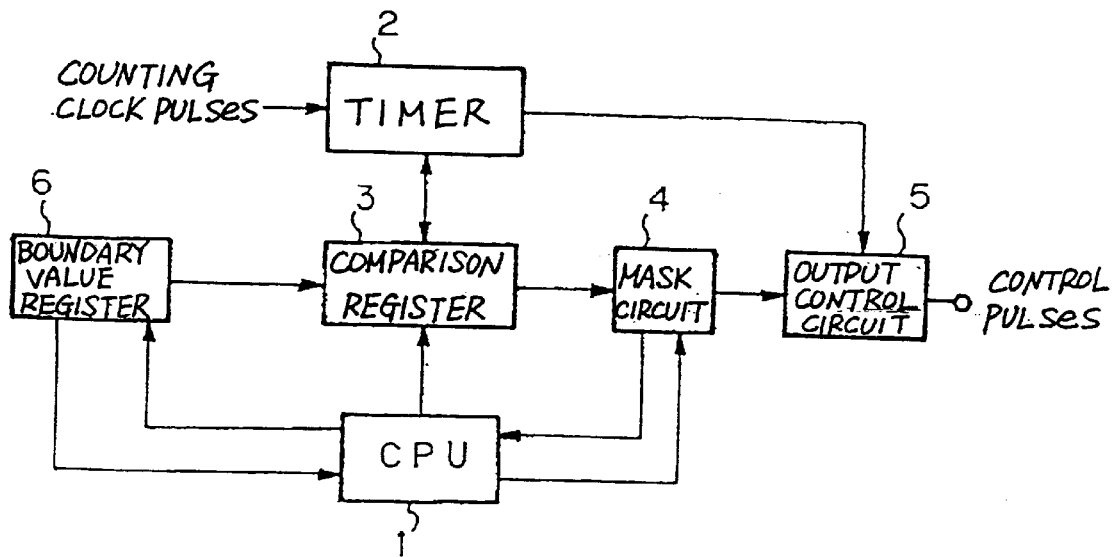
[Fig.4]
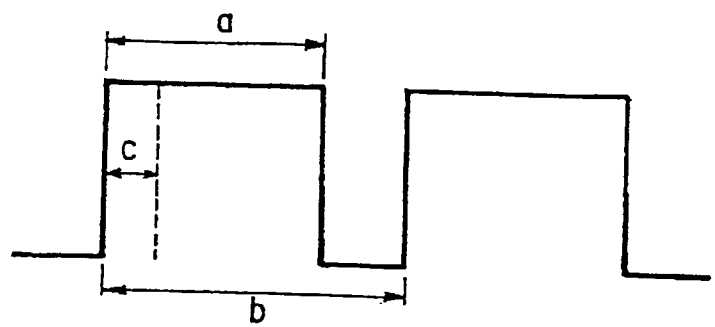

[Fig.5]
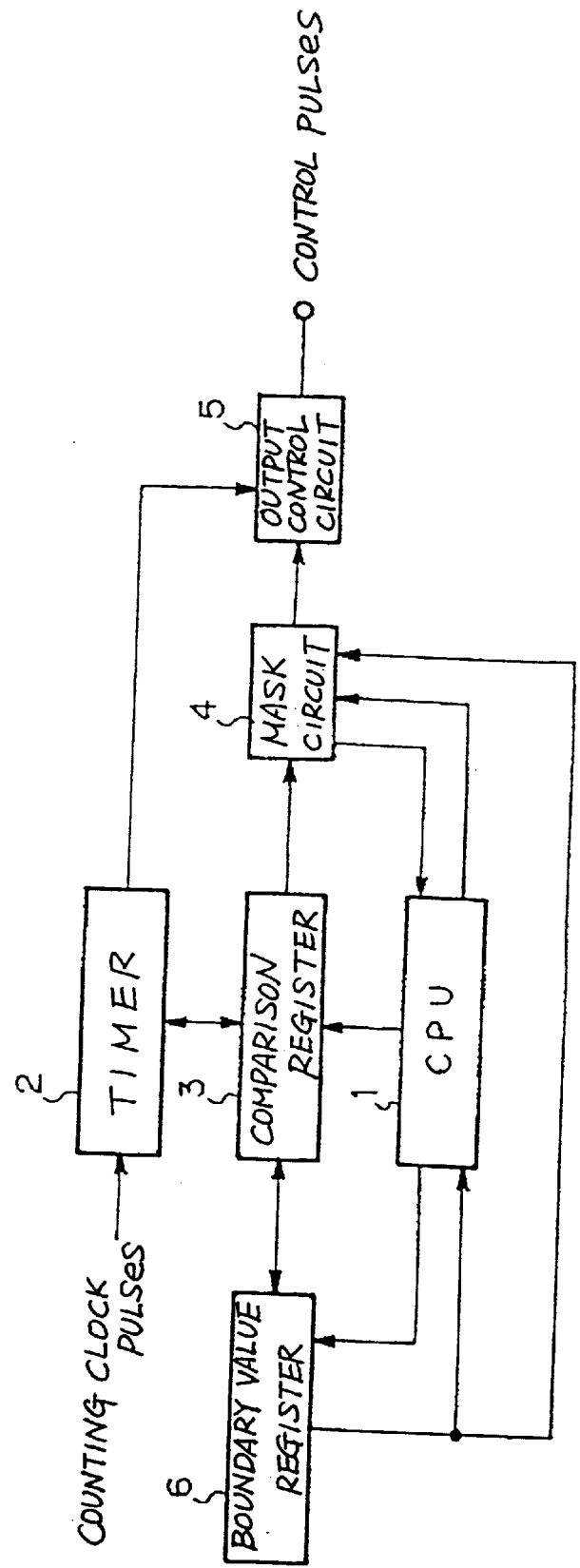

_MICROCOMPUTER BASED SYSTEM FOR THE FAIL-SAFE CONTROL OF AN ELECTRIC MOTOR OR THE LIKE_

BACKGROUND OF THE INVENTION

1. Field of the Invention

The present invention relates to a microcomputer, and more particularly to a microcomputer capable of outputting pulses for controlling an electric motor or the like.

2. Description of the Related Art

FIG. 1 of the accompanying drawings shows in block form a conventional microcomputer capable of outputting pulses for controlling an electric motor or the like.

As shown in FIG. 1, the conventional microcomputer comprises a CPU 1 for controlling the active duration of output pulses and controlling the microcomputer in its entirety, a timer 2 for counting clock pulses of a clock signal supplied as a basic clock for output pulses, a comparison register 3 for holding a setting value established by the CPU 1 for an active pulse duration, comparing the setting value and a count from the timer 2 with each other, and outputting an agreement signal when the setting value and the count agree with each other, a mask circuit 4 for being supplied with the agreement signal from the comparison register 3 and generating and outputting an interrupt signal and an output timing signal based on the supplied agreement signal, and an output control circuit 5 for generating and outputting control pulses based on the output timing signal from the mask circuit 4 and an overflow signal produced by the timer 2 when a overflow occurs in the timer 2.

The CPU 1 controls the active duration of output pulses to determine the rotational speed of an electric motor that is connected to the microcomputer. For details, reference should be made to Japanese laid-open patent publication No. 1990-199503.

Operation of the microcomputer shown in FIG. 1 will be described below.

FIG. 2 of the accompanying drawings shows by way of example control pulses outputted from the microcomputer shown in FIG. 1.

When a clock signal is supplied as a basic clock for output pulses to the timer 2, the timer 2 counts clock pulses of the supplied clock signal. The period "b" of control pulses is determined by an overflow period in the timer 2. If the clock signal and a bit length in the timer 2 are fixed, the period "b" is also fixed.

When the period "b" is determined, the CPU 1 establishes a setting value for an active duration "a" of control pulses, and holds the established setting value in the comparison register 3.

The comparison register 3 then compares the setting value that is held therein and a count from the timer 2 with each other, and outputs an agreement signal when the setting value and the count agree with each other.

When the agreement signal is outputted by the comparison register 3, the mask circuit 4 generates and outputs an interrupt signal and an output timing signal based on the agreement signal.

Thereafter, the output control circuit 5 generates and outputs control pulses having the period "b" and the active duration "a" based on the output timing signal from the mask circuit 4 and the overflow signal from the timer 2.

As the active duration "a" is smaller, the electric motor energized by the control pulses rotates at a higher rotational speed.

As the active duration "a" is greater, the electric motor energized by the control pulses rotates at a lower rotational speed.

The CPU 1 outputs a mask signal to the mask circuit 4 for permitting and inhibiting the output of control pulses from the mask circuit 4.

With the conventional microcomputer, the active duration of control pulses that is established and held in the comparison register 3 is mainly determined by software processing such as calculations in the CPU 1. The conventional microcomputer has no means for detecting any active duration setting value that falls outside of an allowable range, which may have been held in the comparison register 3 due to a bug or the like contained in the program run by the CPU 1. Therefore, if an active duration setting value that falls outside of an allowable range is held in the comparison register 3 due to a bug or the like contained in the program run by the CPU 1, then the rotational speed of the electric motor tends to fall outside of the allowable range, causing a motor driver circuit to be damaged.

As described above, the output of control pulses from the mask circuit 4 is permitted and inhibited by the mask circuit 4 based on a mask signal from the CPU 1. When a failure is detected in an external circuit, data indicative of such a failure is supplied to the CPU 1, which then sends a mask signal to the mask circuit 4 to enable the mask signal 4 to inhibit the output of control pulses from the mask circuit 4. Therefore, in the event of such a failure, the mask circuit 1 itself cannot stop the output of control pulses. Consequently, the conventional microcomputer is unable to quickly inhibit the output of control pulses from the mask circuit 4 in the event of a failure.

SUMMARY OF THE INVENTION

It is therefore an object of the present invention to provide a microcomputer which is capable of detecting an output failure by itself and stopping rotation of an electric motor that is controlled by the microcomputer when the rotational speed of the electric motor falls outside of a predetermined allowable range.

To achieve the above object, there is provided in accordance with the present invention a microcomputer comprising a CPU for establishing a setting value and a boundary value for an active duration of output pulses to control the output pulses and controlling the microcomputer in its entirety, a timer for counting clock pulses of a clock signal supplied as a basic clock for the output pulses, a comparison register for holding the setting value, comparing the setting value and a count from the timer with each other, and outputting an agreement signal when the setting value and the count agree with each other, a mask circuit for being supplied with the agreement signal from the comparison register and generating and outputting an interrupt signal and an output timing signal based on the supplied agreement signal, an output control circuit for generating and outputting control pulses based on the output timing signal from the mask circuit and an overflow signal produced by the timer when a overflow occurs in the timer, and a boundary value register for holding a boundary value for the active duration established by the CPU, comparing the boundary value and the setting value held in the comparison register, and outputting a signal indicative of a failure when a predetermined condition is satisfied, to the CPU.

The boundary value register may comprise means for outputting a signal to inhibit the output timing signal from being outputted, to the mask circuit when the predetermined condition is satisfied.

The boundary value may represent an allowable minimum value for the rotational speed of an electric motor controlled according to the active duration.

The predetermined condition may be that the setting value is smaller than the boundary value.

The predetermined condition may alternatively be that the setting value is greater than the boundary value.

As described above, the boundary value register holds a boundary value, which may represent an allowable minimum value for the rotational speed of an electric motor controlled according to the active duration, compares the boundary value and the setting value held in the comparison register, and outputs a signal indicative of a failure when a predetermined condition is satisfied, to the CPU, for inhibiting the outputting of control pulses.

Since control pulses are inhibited from being outputted to an electric motor or its driver circuit connected to the microcomputer when the setting value for the active duration is of a value which would cause a failure, the electric motor or its driver circuit is prevented from being damaged or destroyed.

The above and other objects, features, and advantages of the present invention will become apparent from the following description with references to the accompanying drawings which illustrate examples of the present invention.

BRIEF DESCRIPTION OF THE DRAWINGS

FIG. 1 is a block diagram of a conventional microcomputer which is capable of outputting pulses for controlling an electric motor or the like;

FIG. 2 is a diagram showing control pulses outputted from the conventional microcomputer shown in FIG. 1;

FIG. 3 is a block diagram of a microcomputer system according to an embodiment of the present invention;

FIG. 4 is a diagram showing control pulses outputted from the microcomputer system shown in FIG. 3; and FIG. 5 is a block diagram of a microcomputer system according to another embodiment of the present invention.

DETAILED DESCRIPTION OF THE PREFERRED EMBODIMENTS

FIG. 3 shows in block form a microcomputer system according to an embodiment of the present invention.

As shown in FIG. 3, the microcomputer system comprises a CPU 1 for controlling the active duration of output pulses and controlling the microcomputer in its entirety, a timer 2 for counting clock pulses of a clock signal supplied as a basic clock for output pulse, a comparison register 3 for holding a setting value established by the CPU 1 for an active pulse duration, comparing the setting value and a count from the timer 2 with each other, and outputting an agreement signal when the setting value and the count agree with each other, a mask circuit 4 for being supplied with the agreement signal from the comparison register 3 and generating and outputting an interrupt signal and an output timing signal based on the supplied agreement signal, an output control circuit 5 for generating and outputting control pulses based on the output timing signal from the mask circuit 4 and an overflow signal produced by the timer 2 when a overflow occurs in the timer 2, and a boundary value register 6 for holding a boundary value for an active duration established by the CPU 1, comparing the boundary value that is held therein and the setting value for an active duration held in the comparison register 3, and outputting a failure interrupt signal indicative of a failure when the setting value for an active duration is smaller than the boundary value, to the CPU 1.

Operation of the microcomputer system shown in FIG. 3 will be described below.

FIG. 4 shows by way of example control pulses outputted from the microcomputer shown in FIG. 3.

When a clock signal is supplied as a basic clock for output pulses to the timer 2, the timer 2 counts clock pulses of the supplied clock signal. The period "b" of control pulses is determined by an overflow period in the timer 2. If the clock signal and a bit length in the timer 2 are fixed, the period "b" is also fixed.

When the period "b" is determined, the CPU 1 establishes a setting value for an active duration "a" of control pulses, and holds the established setting value in the comparison register 3.

The CPU 1 establishes a boundary value that serves as an allowable minimum value for the active duration of control pulses, and holds the established boundary value in the boundary value register 6. The boundary value held in the boundary value register 6 represents an allowable value for the rotational speed of an electric motor (not shown) controlled by the microcomputer according to an active duration of control pulses, for example. If the setting value for an active duration is smaller than the boundary value, then the rotational speed of the electric motor exceeds the allowable value, possibly resulting in damage or breakdown of the electric motor.

Thereafter, the boundary value register 6 compares the boundary value held therein and the setting value held in the comparison register 3 with each other. If the setting value held in the comparison register 3 is greater than the boundary value held in the boundary value register 6, then the comparison register 3 compares the setting value that is held therein and a count from the timer 2 with each other, and outputs an agreement signal when the setting value and the count agree with each other.

When the agreement signal is outputted by the comparison register 3, the mask circuit 4 generates and outputs an interrupt signal and an output timing signal based on the agreement signal.

Thereafter, the output control circuit 5 generates and outputs control pulses having the period "b" and the active duration "a" based on the output timing signal from the mask circuit 4 and the overflow signal from the timer 2.

If the setting value held in the comparison register 3 is smaller than the boundary value due to a bug or the like contained in the program run by the CPU 1, then the boundary value register 6 outputs a failure interrupt signal to the CPU 1, which outputs a mask signal to the mask circuit 4 to enable the mask circuit 4 to inhibit the output timing signal for generating control pulses from being outputted from the mask circuit 4.

FIG. 5 shows in block form a microcomputer system according to another embodiment of the present invention.

As shown in FIG. 5, the microcomputer system according to the other embodiment differs from the microcomputer system shown in FIG. 3 in that when the boundary value register 6 determines that the setting value held in the comparison register 3 is smaller than the boundary value, the boundary value register 6 outputs a failure interrupt signal to the CPU 1 and also outputs a mask signal to the mask circuit 4 for inhibiting the output timing signal for generating control pulses from being outputted from the mask circuit 4.

In the illustrated embodiments, the detection of a failure in the comparison register 3 and the inhibition of outputting of control pulses are carried out by a hardware arrangement. Therefore, any abnormal control pulses are reliably prevented from being outputted to the electric motor.

In the above embodiments, it is assumed that the control pulses have a high active level. However, the principles of the present invention are applicable to the generation and outputting of control pulses having a low active level.

In the above embodiments, the boundary value register 6 outputs a failure interrupt signal to the CPU 1 when the setting value held in the comparison register 3 is smaller than the boundary value. However, the boundary value register 6 may output a failure interrupt signal to the CPU 1 when the setting value held in the comparison register 3 is greater than the boundary value.

With the arrangement of the present invention, as described above, the boundary value register establishes a boundary value which represents an allowable maximum speed level for the rotational speed of the electric motor controlled by the microcomputer according to an active duration of control pulses, compares a setting value for an active duration of control pulses, which is held in the comparison register, with the boundary value, and determines a failure and outputs a signal indicative of the failure if a predetermined condition is satisfied. Therefore, when the setting value for an active duration of control pulses, which is held in the comparison register, is of a value which will cause a failure, control pulses are prevented from being outputted to the electric motor or its driver circuit that is connected to the microcomputer.

In the event of a failure, the boundary value register outputs a signal indicative of the failure to the CPU and also outputs a signal for inhibiting an output timing signal from being outputted, to the mask circuit. Accordingly, when a failure occurs, the microcomputer can quickly stop outputting control pulses to the electric motor or its driver circuit.

It is to be understood that variations and modifications of the cross-connection devices disclosed herein will be evident to those skilled in the art. It is intended that all such modifications and variations be included within the scope of the appended claims.

What is claimed is:

1. A microcomputer based control system comprising:
    a CPU for establishing a setting value and a boundary value for an active duration of output pulses generated by the microcomputer based control system;
    a timer for counting clock pulses of a clock signal supplied as a basic clock signal to the microcomputer based control system and generating a count of the clock pulses;
    a comparison register for holding said setting value, comparing said setting value and the count from said timer with each other, and outputting an agreement signal when said setting value and said count agree with each other;
    a mask circuit supplied with the agreement signal from said comparison register and generating and outputting an interrupt signal and an output timing signal based on the supplied agreement signal;
    an output control circuit for generating and outputting the output pulses based on the output timing signal from said mask circuit and an overflow signal produced by said timer when an overflow occurs in said timer; and
    a boundary value register for holding the boundary value for the active duration established by said CPU, comparing said boundary value and said setting value held in said comparison register, and outputting a signal indicative of a failure when a predetermined condition is satisfied, to said CPU.

2. A microcomputer according to claim 1, wherein said CPU comprises means for outputting a signal to said mask circuit, to inhibit said output timing signal from being outputted, when said boundary value register outputs said signal indicative of a failure.

3. A microcomputer according to claim 1, wherein said boundary value register comprises means for outputting a signal to said mask circuit, to inhibit said output timing signal from being outputted, when said predetermined condition is satisfied.

4. A microcomputer according to claim 1, wherein said boundary value represents an allowable minimum value for the rotational speed of an electric motor controlled according to said active duration.

5. A microcomputer according to claim 1, wherein said predetermined condition is that said setting value is smaller than said boundary value.

6. A microcomputer according to claim 1, wherein said predetermined condition is that said setting value is greater than said boundary value.

7. A microcomputer based control system comprising:
    a CPU for establishing a setting value and a boundary value for an active duration of output pulses generated by the microcomputer based control system;
    a timer for counting clock pulses of a clock signal supplied as a basic clock signal to the microcomputer based control system and generating a count of the clock pulses;
    a comparison register for holding said setting value, comparing said setting value and the count from said timer with each other, and outputting an agreement signal when said setting value and said count agree with each other;
    a mask circuit supplied with the agreement signal from said comparison register and generating and outputting an interrupt signal and an output timing signal based on the supplied agreement signal;
    an output control circuit for generating and outputting the output pulses based on the output timing signal from said mask circuit and an overflow signal produced by said timer when an overflow occurs in said timer; and
    a boundary value register for holding the boundary value for the active duration established by said CPU, comparing said boundary value and said setting value held in said comparison register, and outputting a signal indicative of a failure when a predetermined condition is satisfied, to said CPU,
        wherein said CPU comprises means for outputting a signal to said mask circuit, to inhibit said output timing signal from being outputted, when said boundary value register outputs said signal indicative of a failure, and
        wherein said boundary value register comprises means for outputting a signal to said mask circuit, to inhibit said output timing signal from being outputted, when said predetermined condition is satisfied.

8. A microcomputer based control system comprising:
    a CPU for establishing a setting value and a boundary value for an active duration of output pulses generated by the microcomputer based control system;
    a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, and wherein said boundary value represents an allowable minimum value for the rotational speed of an electric motor controlled according to the active duration.

9. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said boundary value register comprises means for outputting a signal to said mask circuit, to inhibit said output timing signal from being outputted, when said predetermined condition is satisfied, and wherein said boundary value represents an allowable minimum value for the rotational speed of an electric motor controlled according to the active duration.

10. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, wherein said boundary value register comprises means for outputting a signal to said mask circuit, to inhibit said output timing signal from being outputted, when said predetermined condition is satisfied, and wherein said boundary value represents an allowable minimum value for the rotational speed of an electric motor controlled according to the active duration.

11. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, and wherein said predetermined condition is that said setting value is smaller than said boundary value.

12. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said boundary value register comprises means for outputting a signal to said mask circuit, to inhibit said output timing signal from being outputted, when said predetermined condition is satisfied, and wherein said predetermined condition is that said setting value is smaller than said boundary value.

13. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, wherein said boundary value register comprises means for outputting a signal to said mask circuit, to inhibit said output timing signal from being outputted, when said predetermined condition is satisfied, and wherein said predetermined condition is that said setting value is smaller than said boundary value.

14. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said boundary value represents an allowable minimum value for the rotational speed of an electric motor controlled according to the active duration, and wherein said predetermined condition is that said setting value is smaller than said boundary value.

15. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, wherein said boundary value represents an allowable minimum value for the rotational speed of an electric motor controlled according to the active duration, and wherein said predetermined condition is that said setting value is smaller than said boundary value.

16. A microcomputer based control system comprising:
a CPU for establishing a setting value and a boundary value for an active duration of output pulses generated by the microcomputer based control system;
a timer for counting clock pulses of a clock signal supplied as a basic clock signal to the microcomputer based control system and generating a count of the clock pulses;
a comparison register for holding said setting value, comparing said setting value and the count from said timer with each other, and outputting an agreement signal when said setting value and said count agree with each other;
a mask circuit supplied with the agreement signal from said comparison register and generating and outputting an interrupt signal and an output timing signal based on the supplied agreement signal;
an output control circuit for generating and outputting the output pulses based on the output timing signal from said mask circuit and an overflow signal produced by said timer when an overflow occurs in said timer; and
a boundary value register for holding the boundary value for the active duration established by said CPU, comparing said boundary value and said setting value held in said comparison register, and outputting a signal indicative of a failure when a predetermined condition is satisfied, to said CPU, wherein said boundary value register comprises means for outputting a signal to said mask circuit, to inhibit said output timing signal from being outputted, when said predetermined condition is satisfied, wherein said boundary value represents an allowable minimum value for the rotational speed of an electric motor controlled according to the active duration, and wherein said predetermined condition is that said setting value is smaller than said boundary value.

17. A microcomputer based control system comprising:
a CPU for establishing a setting value and a boundary value for an active duration of output pulses generated by the microcomputer based control system;
a timer for counting clock pulses of a clock signal supplied as a basic clock signal to the microcomputer based control system and generating a count of the clock pulses;
a comparison register for holding said setting value, comparing said setting value and the count from said timer with each other, and outputting an agreement signal when said setting value and said count agree with each other;
a mask circuit supplied with the agreement signal from said comparison register and generating and outputting an interrupt signal and an output timing signal based on the supplied agreement signal;
an output control circuit for generating and outputting the output pulses based on the output timing signal from said mask circuit and an overflow signal produced by said timer when an overflow occurs in said timer; and
a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, wherein said boundary value register comprises means for outputting a signal to said mask circuit, to inhibit said output timing signal from being outputted, when said predetermined condition is satisfied, wherein said boundary value represents an allowable minimum value for the rotational speed of an electric motor controlled according to the active duration, and wherein said predetermined condition is that said setting value is smaller than said boundary value.

18. A microcomputer based control system comprising:
a CPU for establishing a setting value and a boundary value for an active duration of output pulses generated by the microcomputer based control system;
a timer for counting clock pulses of a clock signal supplied as a basic clock signal to the microcomputer based control system and generating a count of the clock pulses;
a comparison register for holding said setting value, comparing said setting value and the count from said timer with each other, and outputting an agreement signal when said setting value and said count agree with each other;
a mask circuit supplied with the agreement signal from said comparison register and generating and outputting an interrupt signal and an output timing signal based on the supplied agreement signal;
an output control circuit for generating and outputting the output pulses based on the output timing signal from said mask circuit and an overflow signal produced by said timer when an overflow occurs in said timer; and
a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, and wherein said predetermined condition is that said setting value is greater than said boundary value.

19. A microcomputer based control system comprising:
a CPU for establishing a setting value and a boundary value for an active duration of output pulses generated by the microcomputer based control system;
a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said boundary value register comprises means for outputting a signal to said mask circuit, to inhibit said output timing signal from being outputted, when said predetermined condition is satisfied, and wherein said predetermined condition is that said setting value is greater than said boundary value.

20. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said, wherein said CPU comprises means for outputting a signal to said mask circuit, to inhibit said output timing signal from being outputted, when said boundary value register outputs said signal indicative of a failure, wherein said boundary value register comprises means for outputting a signal to said mask circuit, to inhibit said output timing signal from being outputted, when said predetermined condition is satisfied, and wherein said predetermined condition is that said setting value is greater than said boundary value.

21. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said boundary value represents an allowable minimum value for the rotational speed of an electric motor controlled according to the active duration, and wherein said predetermined condition is that said setting value is greater than said boundary value.

22. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, wherein said boundary value represents an allowable minimum value for the rotational speed of an electric motor controlled according to the active duration, and wherein said predetermined condition is that said setting value is greater than said boundary value.

23. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said boundary value register comprises means for outputting a signal to said mask circuit, to inhibit said output timing signal from being outputted, when said predetermined condition is satisfied, wherein said boundary value represents an allowable minimum value for the rotational speed of an electric motor controlled according to the active duration, and wherein said predetermined condition is that said setting value is greater than said boundary value.

24. A microcomputer based control system comprising:

a CPU for establishing a setting value and a boundary value for an active duration of output pulses generated by the microcomputer based control system;

a timer for counting clock pulses of a clock signal supplied as a basic clock signal to the microcomputer based control system and generating a count of the clock pulses;

a comparison register for holding said setting value, comparing said setting value and the count from said timer with each other, and outputting an agreement signal when said setting value and said count agree with each other;

a mask circuit supplied with the agreement signal from said comparison register and generating and outputting an interrupt signal and an output timing signal based on the supplied agreement signal;

an output control circuit for generating and outputting the output pulses based on the output timing signal from said mask circuit and an overflow signal produced by said timer when an overflow occurs in said timer; and a boundary value register for holding the boundary value for the active duration established by said CPU, comparing said boundary value and said setting value held in said comparison register, and outputting a signal indicative of a failure when a predetermined condition is satisfied, to said CPU, wherein said CPU comprises means for outputting a signal to said mask circuit, to inhibit said output timing signal from being outputted, when said boundary value register outputs said signal indicative of a failure, wherein said boundary value register comprises means for outputting a signal to said mask circuit, to inhibit said output timing signal from being outputted, when said predetermined condition is satisfied, wherein said boundary value represents an allowable minimum value for the rotational speed of an electric motor controlled according to the active duration, and wherein said predetermined condition is that said setting value is smaller than said boundary value.

* * * * *